United States Patent [19]
Perosky et al.

[11] Patent Number: 5,651,435
[45] Date of Patent: Jul. 29, 1997

[54] REVERSE BRAKE FOR MANUAL TRANSMISSIONS

[75] Inventors: Edward Perosky, Sterling Heights, Mich.; Mark A. Noto, Bloomington, Ill.

[73] Assignee: New Venture Gear, Inc., Troy, Mich.

[21] Appl. No.: 509,526

[22] Filed: Jul. 31, 1995

[51] Int. Cl.$^6$ .................. F16H 3/38; F16D 23/06
[52] U.S. Cl. ............ 192/4 C; 192/53.34; 74/339; 74/411.5
[58] Field of Search ................... 192/4 A, 4 C, 192/18 R, 53.3, 53.34, 53.341, 53.342, 53.343; 74/339, 411.5

[56] References Cited

U.S. PATENT DOCUMENTS

| | | |
|---|---|---|
| 3,745,847 | 7/1973 | Worner et al. ............... 74/339 |
| 4,189,041 | 2/1980 | Muller ..................... 192/53.34 |
| 4,225,024 | 9/1980 | Kuzma . | 
| 4,294,338 | 10/1981 | Simmons . |
| 4,598,599 | 7/1986 | Ikemoto ................... 192/53.343 |
| 5,381,878 | 1/1995 | Ohshima et al. ........... 192/4 A |
| 5,445,253 | 8/1995 | Reyes ..................... 192/4 C |

FOREIGN PATENT DOCUMENTS 54-98451  8/1979  Japan ................. 74/411.5

Primary Examiner—Richard M. Lorence
Attorney, Agent, or Firm—Harness, Dickey & Pierce, P.L.C.

[57] ABSTRACT

A synchronizer unit eliminates the chattering noise generated when shifting a manual transmission into reverse from a forward gear while the drive shaft continues to rotate in the direction corresponding with the forward gear by providing a reverse brake arrangement for arresting rotation of the input shaft. The reverse brake arrangement includes a shaft rotatably supported by the transmission housing and a clutch hub mounted on the shaft which is adapted to rotate with the shaft. The clutch hub has a splined outer circumference. A shift sleeve is provided for engagement with the splined outer circumference of the clutch hub and is movable in the axial direction of the shaft. The reverse brake mechanism further includes a frustoconical cone in coaxial relation to the shaft and disposed on a first side of the clutch hub. The frustoconical cone includes a frustoconical surface on its outer periphery. A first blocker ring is coaxially aligned with the shaft. The first blocker ring including a conical surface adapted to be fitted on the frustoconical surface of the frustoconical cone, such that axial translation of the shift sleeve in a direction toward the frustoconical cone urges the first blocker ring against the frustoconical cone. The frustoconical cone is mounted in the housing for limited rotation and includes at least one tang extending therefrom.

20 Claims, 3 Drawing Sheets

REVERSE BRAKE FOR MANUAL TRANSMISSIONS

TECHNICAL FIELD

The present invention relates to an improved shift control apparatus for a multiple speed, manual automotive transmission. More particularly, the present invention relates to a reverse brake for manual transmissions for eliminating the chattering noise generated when shifting into reverse from a forward gear while the drive shaft continues to rotate in the direction corresponding with the forward gear.

BACKGROUND OF THE INVENTION

During operation of a typical conventional manual transmission, a reverse gear is engaged with the use of a sliding gear, coupler or another device when reverse drive is selected by the vehicle operator for interconnecting the reverse gear with the input shaft. Often the transmission is disengaged from one of the forward gears immediately prior to the selection of reverse gear. At such time, the input shaft is free to inertially rotate under a substantially no-load condition until, through friction and windage losses, the rotating inertia of the input shaft is dissipated and rotation in a forward direction is arrested.

If the gear selector lever is moved so as to attempt to interconnect the stationary reverse gear with the input shaft while the input shaft remains rotating in a direction corresponding with a forward drive gear, the teeth of the coupler or synchronizer sleeve will strike the non-moving clutch teeth associated with the reverse gear. The force applied manually by the vehicle operator to the coupler or synchronizer sleeve toward the direction of the engagement with the reverse gear results in an undesirable clattering as the tips of the sleeve teeth and those of the dog or clutch teeth are forced together, but unable to mesh because of their relative rotational speeds. This condition translates to an unpleasant grinding noise and feel to the vehicle operator. In certain instances, if the forces applied by the vehicle operator are sufficiently large, damage to the clutch teeth or those of the sleeve may result. Therefore, to avoid this condition, the vehicle operator is forced to wait several seconds for the input shaft to discontinue rotation before the gearshift lever can be moved quietly and smoothly to engage the reverse gear ratio.

Rather than resolution, modern technology has resulted in accentuation of this problem. Factors such as continued desires to improve vehicle gas mileage and to improve shifting operations in cold climates are the major contributors. In this regard, the introduction of low-viscosity lubricating oil into a manual transmission as a way to improve performance has further decreased the negative forces which naturally act on an input shaft to arrest rotational motion. As a result, the input shafts of modern transmissions are permitted to inertially rotate under substantially no-load conditions for increasingly longer durations.

One known technique to provide substantially equivalent rotational speeds between rotational parts is a fully synchronized gear arrangement. With respect to forward drive gears, this approach has been adopted as standard throughout the automotive industry. However, the cost and complexity associated with such an arrangement adapted to synchronize the reverse drive engagement has not been commercially justified, particularly in view of a need that is considered to be limited. In this regard, it can be generally assumed that reverse drive is selected when the vehicle is operating at low speed or when the drive wheels are fully stopped.

Nonetheless, any delay incurred after the neutral clutch pedal is depressed and before the shift lever can be moved to the reverse drive position to avoid causing gear clashing is objectionable. This is particularly true in small vehicles where high speed engines and manual transmissions are often used. Even at the idle speed of small modern engines, the forward gear ratios are driven at relatively high rotational speeds, have inherently high inertia, and require longer periods of delay before the reverse drive gear may be engaged. It follows that the chattering noise and grinding feedback discussed above could be virtually eliminated by ensuring that rotation of the input shaft was substantially arrested before attempting to engage the reverse drive gear.

Several prior devices have been developed in an attempt to eliminate the undesirable grinding noise and feel often encountered when shifting a manual transmission into reverse drive. For example, U.S. Pat. No. 4,294,338 to Simmons discloses a shift apparatus including a modified synchronizer which functions as a countershaft brake. A brake cone is non-rotationally fixed to the housing and pilots on a countershaft. Similarly, U.S. Pat. No. 4,598,599 to Ikemoto also discloses a shift apparatus including a modified synchronizer which functions as a countershaft brake. U.S. Pat. No. 4,225,024 to Kuzma discloses a locking device for reverse gear of a manual transmission. A friction ring is nonrotatably disposed on a drive shaft of the transmission and is slidable between a gear wheel and a dog disposed coaxially with respect to the driven shaft.

While these prior known devices have proven to be commercially acceptable, each is attendant with its drawbacks and inherent limitations. For example, some prior known devices creates the possibility that the cone many not position as readily with the synchronizer creating a blocking effect resulting in difficulty completing the engagement of the reverse gear ratio. Other prior known devices are associated with increased manufacturing, maintenance and assembly costs.

Thus, there remains a need in the art for a simple, inexpensive reverse brake for a manual transmission which is effective to eliminate gear chatter when a shifting into reverse from a forward gear.

SUMMARY OF THE INVENTION

This invention is directed to an apparatus which overcomes the drawbacks of prior known devices. In a preferred embodiment, the apparatus of the present invention comprises a reverse brake arrangement for a manual transmission of the type including a housing. The reverse brake arrangement includes a shaft rotatably supported by the transmission housing, and a clutch hub mounted on the shaft. The clutch hub is adapted to rotate with the shaft and includes a splined outer circumference. The reverse brake arrangement further includes a shift sleeve engaged with the splined outer circumference of the clutch hub by a spline movable in the axial direction of the shaft. A frustoconical cone is provided coaxial relation to the shaft and disposed on a first side of the clutch hub. The frustoconical cone has a frustoconical surface on an outer periphery thereof. A first blocker ring is disposed coaxially with the shaft which includes a conical surface adapted to be fitted on the frustoconical surface of the frustoconical cone, such that axial translation of the shift sleeve in a direction toward the frustoconical cone urges the first blocker ring against the frustoconical cone. The frustoconical cone is mounted for limited rotation and includes at least one tang extending therefrom. In the preferred embodiment, the frustoconical cone includes a plurality of tangs, each of which are disposed within a slot defined by a portion of the transmission housing. Further in the preferred embodiment, the frustoconical cone, or reverse brake cone is mounted for limited radial translation.

Accordingly, a reverse brake mechanism is provided which is preferably recessed in the transmission casing and piloted thereby, allowing the reverse brake to rotate and "float" within the transmission casing to effectively pilot when energized. When the reverse gear ratio is desired, a synchronizer shift mechanism is slidably moved toward the reverse brake cone and the shift sleeve contacts the toothing of the synchronizing blocking ring which "clocks" the ring, thereby creating a cone torque between the ring and the reverse brake cone. The reverse brake cone is free for limited rotational movement within the recessed slots defined by a portion of the transmission casing, allowing the brake cone to better pilot and center itself in relation to the synchronizing blocking ring. Upon reaching the limit of its allowed rotation, as defined by the contact between the radially projecting stop tangs on the reverse brake cone and the slots within the transmission housing, the brake cone becomes a stop brake effectively bringing the rotation of the input shaft to a stop position.

BRIEF DESCRIPTION OF THE DRAWINGS

Further objects, features and advantages of the present invention will become apparent from analysis of the following written specification and the accompanying drawing and the appended claims in which:

DETAILED DESCRIPTION OF THE PREFERRED EMBODIMENT

The present invention provides an improved synchronizer unit which includes a reverse brake arrangement for arresting rotation of a shaft when shifting a transmission to reverse from a forward gear. While shown in a synchronizing unit adapted to the input shaft of a manual transmission, those skilled in the art will appreciate that the invention is not so limited in scope and is readily adaptable for use with any mechanical device incorporating a shaft that needs to be rotational arrested.

Figure 1:
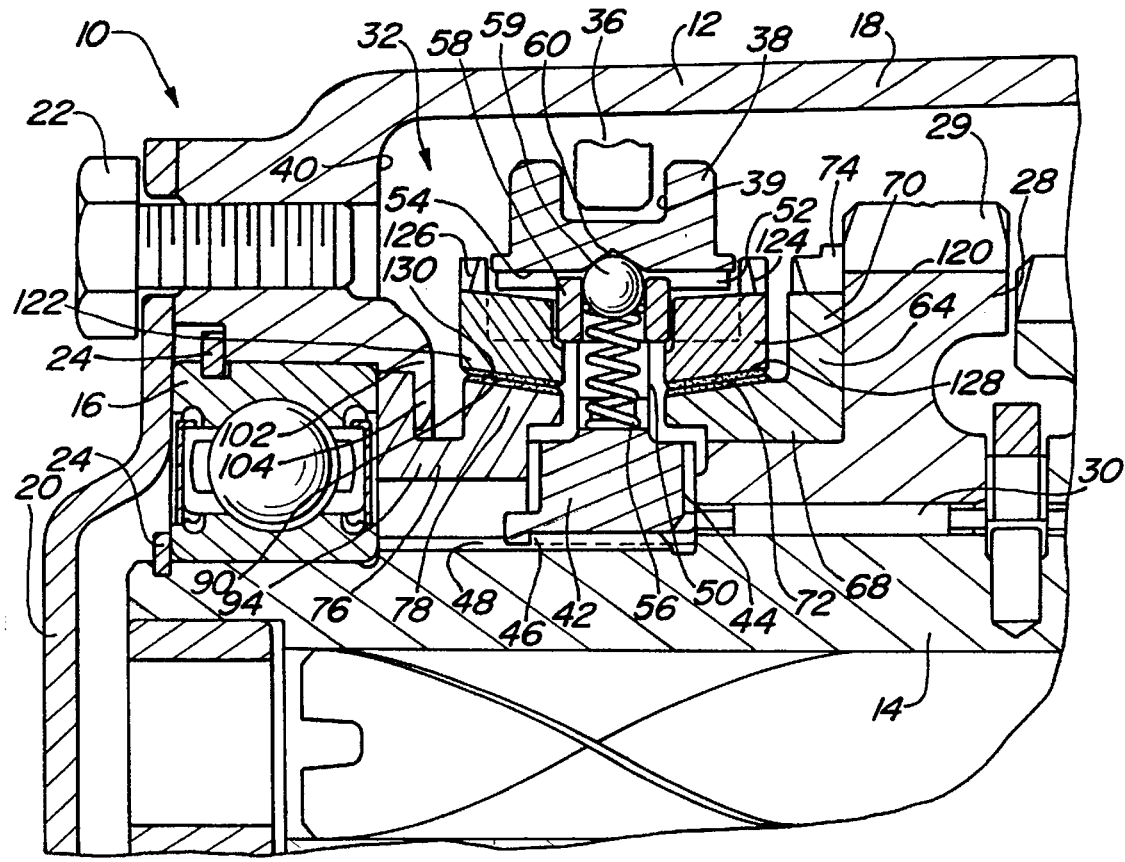
FIG. 1 is a cross-sectional view of a portion of an exemplary manual transmission including a reverse brake arrangement for arresting rotation of a shaft which is constructed in accordance with the teachings of a first preferred embodiment of the present invention.

Turning to the drawings, identical or equivalent elements have been denoted with like reference numerals. Referring to FIG. 1, a portion of a five-speed manual transmission is identified generally at 10. Transmission 10 is shown to include a housing 12 and an input shaft 14 rotationally mounted within housing 12 by bearings 16. Housing 12 includes a first housing member 18 and an end cover 20 secured to first housing member 18 by a plurality of threaded fasteners, one of which is shown at 22. Input shaft 14 is adapted to receive driving input torque from a suitable power source (e.g., an internal combustion engine) in a well-known manner. A pair of snap rings 24 prevent axial displacement of bearing 16 in an aft direction (i.e., leftward as shown in FIG. 1) during assembly of transmission housing 12. After assembly of transmission housing 12 has been completed, cover 20 cooperates with snap rings 24 to prevent aftward axially displacement.

Shown in FIG. 1 is a fifth speed gear ratio 28. While not shown, the exemplary transmission 10 of FIG. 1 will be understood to further include first, second, third, fourth and reverse speed gear ratios of conventional construction. However, differing gear arrangements and additional speed gear ratios are possible without varying the scope of the present invention. Reference may be had to U.S. Pat. No. 4,677,868 which discloses in more detail a suitable manual transmission for use with the present invention, the disclosure of which is expressly incorporated herein by reference. As can be seen in FIG. 1, forward gear ratio 28 is rotatably supported on input shaft 14 by a needle roller bearing 30. In addition, forward gear ratio 28 is formed to include gear teeth 29 and is adapted to meshingly engage a mating gear (not shown) splined to a transmission countershaft (not shown) for providing driving output.

A synchronizer unit 32 is mounted on input shaft 14. Synchronizer unit 32 is actuated by means of a shift fork, partially indicated at 36, which is supported on a gear box shift selector rail (not shown). As will be appreciated by those skilled in the art, shift fork 36 is longitudinally slidable with its selector rail and is connected by a yoke portion (not shown) to a shift sleeve 38 of synchronizer unit 32 by means of a circumferential external groove 39.

In the disclosed embodiment, synchronizer unit 32 is a "strut-type" synchronizer unit, a complete description of which may be had by referring to commonly assigned U.S. Pat. No. 5,085,303, the disclosure of which is hereby expressly incorporated by reference. As will become more apparent below, synchronizer unit 32 operatively provides a synchronizing action between shaft 14 and forward gear ratio 28 and incorporates a reverse brake arrangement for providing a braking action of shaft 14. Synchronizer unit 32 is depicted intermediate forward gear ratio 28 and an end portion 40 of first housing member 18 of transmission housing 12.

With continued reference to FIG. 1, synchronizer unit 32 is shown to include a clutch hub 42 having an inner web portion 44 fixed to input shaft 14 through clutch hub internal splines 46 engaging input shaft external splines 48. Clutch hub 42 includes a longitudinally extending circumferential portion having an externally splined surface 52 formed thereon. Shift sleeve 38 is mounted for rotation with clutch hub 42 on input shaft 14 by means of clutch hub externally splined surface 52 slidably engaging a sleeve internal splined surface 54. Thus, shift sleeve 38 is axially movable in a fore or aft direction relative to clutch hub 42 by means of shift fork 36.

Synchronizer unit 32 further includes thrust means associated with shift sleeve 38 for energizing synchronizer unit 32 upon axial shifting of shift sleeve 32 in one of the fore and aft directions. In the exemplary embodiment of FIG. 1, the thrust means is shown to include helical compression springs 56. As is known in the art, helical compression springs 56 are compressed and inserted between a plurality of circumferentially spaced strut members 58 and clutch hub 42. In the particular embodiments shown, three (3) strut members 58 are uniformly spaced on 120° centers. While not shown in detail, it will be appreciated by those skilled in the art that strut members 58 are adapted to be biased radially outward by springs 56 in their respective longitudinally extending guide slots (not shown). Guide slots are formed in web portion 44 of clutch hub 42 and have longitudinally extending side walls configured to cooperate with facing edge surfaces of strut for retaining strut member 58 against dislodgement out of guide slots under all radially outward forces. Compression springs 56 are sized to produce a predetermined compressive force for biasing strut members 58 in a radially outward direction within guide slots for permitting strut members 58 to move in an axial direction upon axial movement of shift sleeve 38. Springs 56 directly bias a stop ball 59 which in a neutral position of synchronizer unit 32 rides in an annular groove 60 formed in shift sleeve 38.

A drive member or synchronizer cone 64 is carried on an axially extending portion of forward gear ratio 28. As shown in FIG. 1, synchronizer cone 64 includes an annular rim projection 68 extending transversely from a disk portion 70 on which is formed an external frustoconical friction surface 72. External clutch teeth 74 are formed along the outer periphery of the radially projecting disk portion 70. It will be appreciated by those skilled in the art that alternatively synchronizer cone 64 can be formed to include internal splines (not shown) which meshingly engage external splines (not shown) of input shaft 14, such that synchronizer cone 64 is directly driven by input shaft 14.

Synchronizer unit 32 is shown to further include a reverse brake cone 76 specifically adapted to provide speed synchronization between shaft 14 and housing 12. Particularly, reverse brake cone 76 is adapted to arrest rotational movement of shaft 14 upon axially leftward shifting of shift sleeve 38. Reverse brake cone 76 is axially interdisposed between end wall portion 40 of first housing member 18 of housing 12 and clutch hub 42.

With particular reference to FIGS. 2 through 5, additional features of reverse brake cone 76 and its cooperating relationship with housing 12 will be described. Reverse brake cone 76 includes a transversely extending disk portion 78 on which is formed an external frustoconical friction surface 90 that converges toward the right hand end thereof. A plurality of tangs 92 project radially from the left end surface of an annular rim projection 94 of reverse brake cone 76. Each tang 92 includes a pair of side walls 96 and a circumferential wall portion 98. As will become more apparent below, tangs 92 serve to limit rotation of reverse brake cone 76 with respect to transmission housing 12. In the exemplary embodiment illustrated, reverse brake cone 76 is shown to include three radially projecting tangs 92 equally spaced circumferentially about reverse brake cone 76. However, it will be appreciated by those skilled in the art, that reverse brake cone 76 can be readily modified to incorporate any number of radially projecting tangs 92.

Synchronizer unit 32 further includes means for limiting rotation of reverse brake cone 76 and means for limiting radial translation of reverse brake cone 76. In the preferred embodiment, the means for limiting rotation of reverse brake cone 76 and the means for limiting axial translation of reverse brake cone are a slot or slots 100 defined by end wall portion 40 of transmission housing 12. As shown most clearly in FIGS. 1 and 2, reverse brake cone 76 is positioned in slots 100 and is supported thereby. More specifically, end wall portion 40 of transmission housing 12 is formed to include a plurality of slots 100 corresponding in number to the number of tangs 92 of reverse brake cone 76. In the exemplary embodiment, end wall portion 40 is formed to include three such slots 100 which are circumferentially arranged.

Slots 100 are defined by a plurality axially extending portions 102 of end wall 40. Each axially extending portion 102 of end wall 40 includes a flange portion 104 integrally formed therewith that extends in a radially inward direction toward shaft 14. Flange portions 104, which are generally arcuate in shape, are circumferentially arranged and each include a pair of stop surfaces 106 and an arcuate inner surface 108. Arcuate inner surfaces 108 each lie on a common circle axially arranged with shaft 14. Adjacent stop surfaces 106 of adjacent flange portions 108 cooperate to limit rotation of reverse brake cone 76. Arcuate inner surfaces 108 cooperate to limit radial translation of reverse brake cone 76, and thereby pilot reverse brake cone 76.

Synchronizer unit 32 is shown to further includes a first blocker ring 120 and a second blocker ring 122. First and second blocker rings 120, 122 are disposed fore and aft, respectively, of clutch hub 42. First and second blocker rings 120, 122 are substantially mirror images of one another and are each formed to include external clutch teeth 124, 126, respectively, and an internal frustoconical friction surface 128, 130, respectively. Internal frustoconical friction surfaces 128, 130 of first and second blocker rings 120, 122, respectively are arranged to generally surround external frustoconical friction surfaces 72, 90 on synchronizer cone 64 and reverse brake cone 76, respectively.

It will be noted that in the disclosed embodiments external frustoconical friction surfaces 72, 90 and external frustoconical friction surfaces 128, 130 are in the form of a friction pad or lining bonded or cemented to its associated conical surface for providing effective frictional engagement. An example of one type of suitable friction lining that may be used with the present invention is disclosed in U.S. Pat. No. 4,267,912 issued May 29, 1981 to Bauer, et al. The disclosure of which is expressly incorporated by reference herein.

Clutch teeth 124 of first blocker ring 120 are coaxial and alignable with external clutch teeth 74 formed on the outer circumferential portion of forward gear ratio 28. Clutch teeth 124 and clutch teeth 74 are engageable with shift sleeve internal splined surface 54, the splines of which are in continual meshed engagement with clutch hub externally splined surface 52, upon shift sleeve 38 being shifted rightwardly toward forward gear ratio 28 and into a first operating position or forward gear mode. Clutch teeth 126 of second blocker ring 122 are similarly engageable with shift sleeve internal splined surface 54 upon axial movement of shift sleeve 38 to a second operating position.

With particular reference to FIG. 1, the operation of the present invention heretofore detailed will now be described.

Initial rightward axial movement of shift sleeve 38 toward forward gear ratio 28 causes ball 59 to be displaced from groove 60, thereby biasing strut members 58 to correspondingly move axially in the same direction until strut members 58 engage blocker ring 120. Next, a detent load builds up as blocker ring 120 is axially pressed by internal splined surface shift sleeve 38. This contact force against external clutch teeth 124 of blocker ring 120 generates initial "cone" torque between blocker ring 120 internal frustoconical friction surface 130 and external frustoconical friction surface 72 of synchronizer cone 64. This initial "cone" torque causes blocker ring 120 to be rotated or "clocked" to an indexed position wherein external clutch teeth 124 of blocker ring 120 allow shift sleeve 38 to axially move to a chamfer-to-chamfer loading position between the opposed faces of externally toothed surface 124 on blocker ring 120 and internal splined surface 54 of shift sleeve 38.

When the speed of forward speed ratio 28 relative to blocker ring 120 approaches "zero", the cone torque falls to zero. Synchronization is now complete and blocker ring 120 is no longer energized. Since the index torque resulting from the chamfer-to-chamfer loading between shift sleeve internal splined surface 54 and blocker ring teeth 124 exceeds the cone torque, blocker ring 120 rotates in an opposite direction and out of its "clocked" position. Thereafter, speed gear ratio 28 rotates aside to pass sleeve internal splined surface 54 beyond blocker ring teeth 124 until there is locked contact between sleeve splined surface 54 and its associated gear teeth splines 74.

Synchronizer unit 32 incorporates unique structure so as to provide synchronization of input shaft 14 with transmission housing 12 in substantially the same manner as the aforementioned synchronizer action between input shaft 14 and forward gear ratio 28. In other words, when shift sleeve 38 is shifted in an aft direction synchronizer unit 32 serves to arrest rotation of input shaft 14 relative to transmission housing 12.

In operation, upon gear shift sleeve 38 being axially shifted from its neutral position leftward, sleeve 42 contact external clutch teeth 126 of blocker ring 122. Next, a detent load builds up as blocker ring 122 is pressed by internal splines 54 of gear shift sleeve 38 generating initial "cone" torque between blocker ring 122, internal frustoconical friction surface 130 and external frustoconical friction surface 90 of reverse brake cone 76. This initial "cone" torque causes blocker ring 122 to be rotated or "clocked" to an indexed position wherein external clutch teeth 126 of blocker ring 122 allow shift sleeve 38 to move to a chamfer-to-chamfer loading position between the opposed faces of externally toothed surface 126 on blocker ring 122 and internally splined surface 54 of gear shift sleeve 38. At this point, reverse brake cone 76, piloting on transmission housing 12 clocks until radially projecting tangs 92 are rotationally stopped by transmission housing 12, thereby creating a braking effect on blocker ring 122, gear shift sleeve 38, and ultimately input shaft 14.

When the speed of rotation of blocker ring 122 and gear shift sleeve 38 approaches zero, the cone torque correspondingly falls to substantially zero. Rotation of input shaft 14 is arrested and the braking function is now complete. At this point, the reverse idler (not shown) can be engaged for a reverse gear ratio (not shown) to be utilized. Upon the reverse rotation of input shaft 14, the reverse torque created by the rotation biases gear shift sleeve 38 rightwardly towards the neutral position and is locked into position as annular groove 60 is engaged by stop ball 59.

Figure 6:
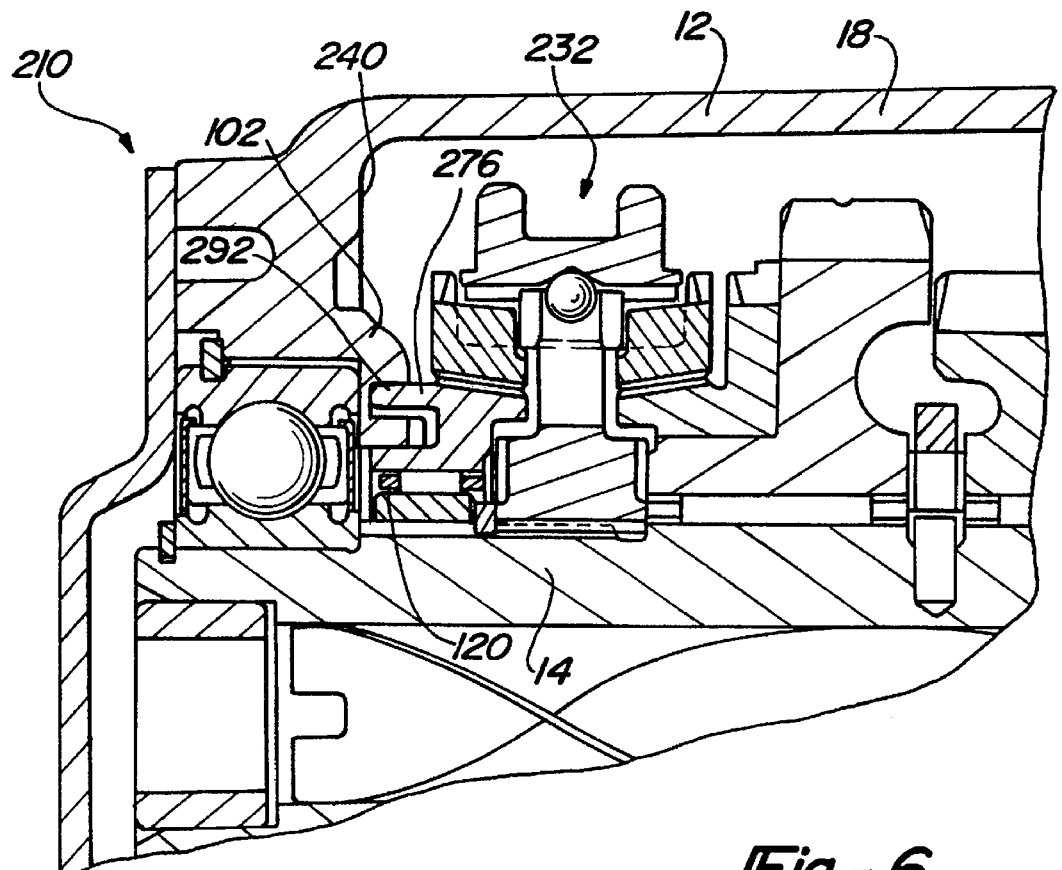
FIG. 6 is a cross-sectional view similar to FIG. 1 illustrating a portion of a manual transmission incorporating a reverse brake mechanism constructed in accordance with the teachings of a second preferred embodiment of the present invention.
Figure 7:
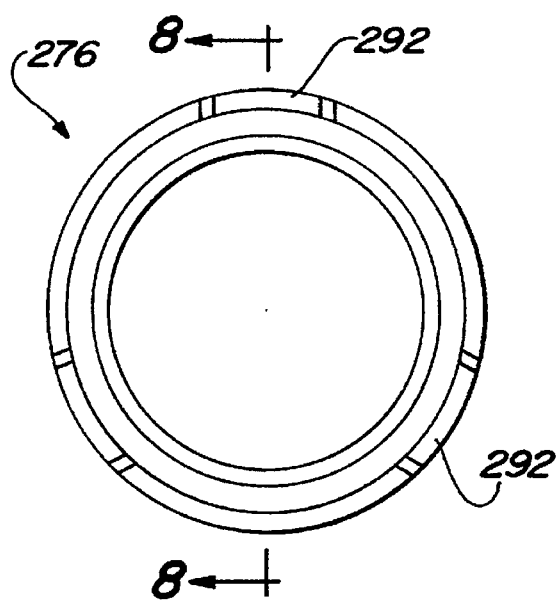
FIG. 7 is a rear view of the reverse brake cone of FIG. 6 showing in detail the three axially extending tangs that cooperate with the recessed slots defined by the transmission housing to limit rotational movement of the reverse brake cone.
Figure 8:
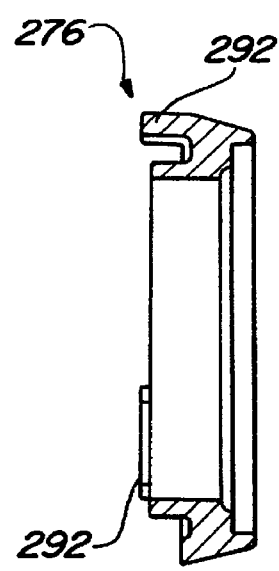
FIG. 8 is a cross-sectional view taken through line 8—8 of FIG. 7.

Turning to FIGS. 6 through 8, a second preferred embodiment of the present invention will be described. FIG. 6 illustrates a portion of a manual transmission 210 incorporating synchronizer unit 232 including a reverse brake mechanism constructed in accordance with the second preferred embodiment of the present invention. FIGS. 7 and 8 further detail the construction of reverse brake cone 276. In general, synchronizer unit 232 is substantially identical in function and form to synchronizer unit 32 of the first preferred embodiment, with the exception of the configuration of reverse cone brake 276 and the manner reverse cone brake 276 is supported for rotation. As such, like reference numerals are used to identify components that are substantially identical to those previously described. Reference numerals for modified elements have been increased by a factor of 200.

In general, reverse brake cone 76 has been modified to cooperate with a needle bearing 120 for rotationally supporting reverse brake cone 276 on shaft 14. Similar to reverse brake cone 76 of the first preferred embodiment, reverse brake cone 276 is formed to include a plurality of tangs 292. In the second preferred embodiment, however, tangs 292 are formed to project axially from the left end surface of reverse brake cone 276. Tangs 292 function to limit rotation of reverse brake cone 276 with respect to transmission housing 12. In the exemplary embodiment illustrated, reverse brake cone 276 is shown to include three axially projecting tangs 292 equally spaced circumferentially from the left end of reverse brake cone 276. However, it will be appreciated by those skilled in the art, that reverse brake cone 276 can be readily modified to incorporate any number of axially projecting tangs 292.

Figure 2:
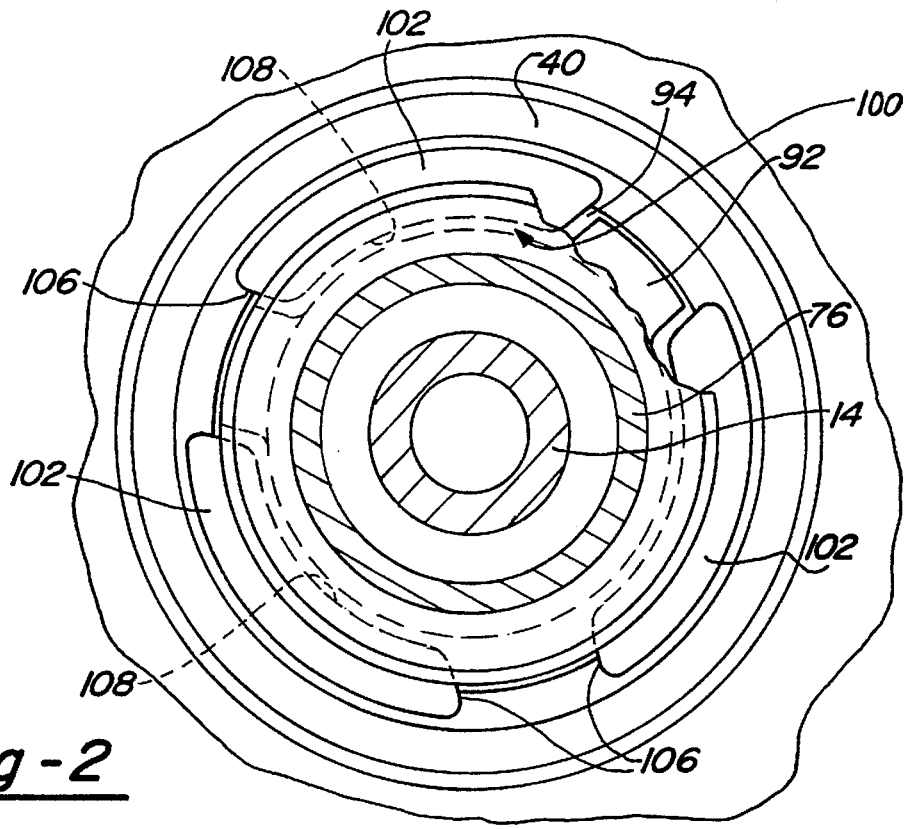
FIG. 2 is a cross-sectional view taken through a portion of the manual transmission of FIG. 1, and illustrating the cooperating relationship between a plurality of slots defined by a portion of the transmission housing and a plurality of tangs extending from the left end of the reverse brake cone shown in FIG. 1.
Figure 3:
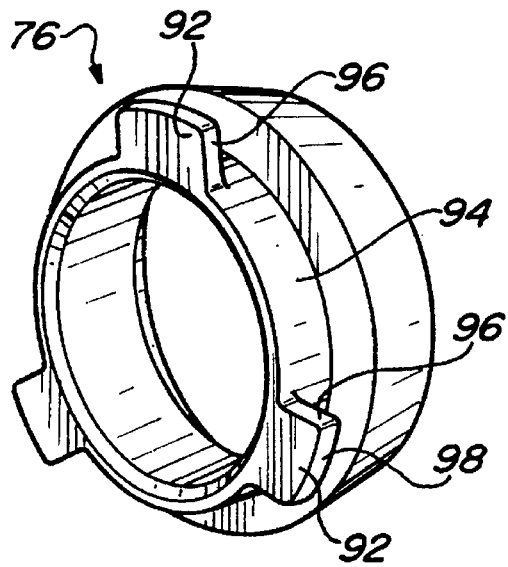
FIG. 3 is a perspective view of the reverse brake cone shown in FIG. 1 showing in detail the three tangs that cooperate with the recessed slots of the transmission housing to limit rotational movement of the reverse brake cone.
Figure 4:
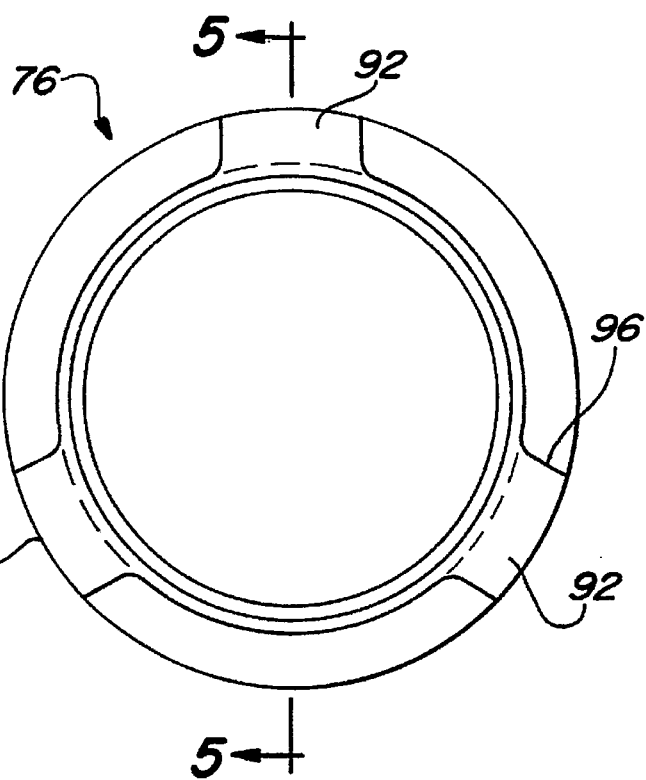
FIG. 4 is a rear view of the reverse brake cone shown in FIG. 1.
Figure 5:
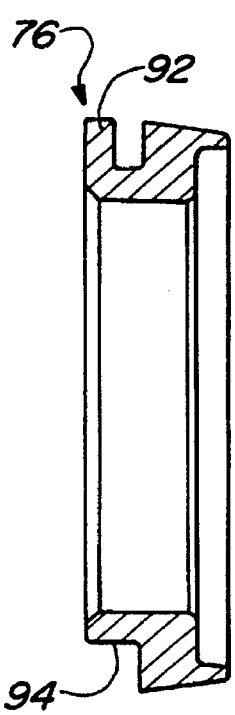
FIG. 5 is a cross-sectional view taken along line 5—5 of FIG. 4.

Reverse brake cone 276 is positioned in a slot or slots 100 (not clearly shown in FIG. 6, but substantially identical to slots 100 shown in FIG. 2). Slots 100 are formed in end wall portion 240 of transmission housing 12. More specifically, end wall portion 240 of transmission housing 12 is formed to define a plurality of slots 94 corresponding in number to the number of tangs 292 of reverse brake cone 276. In the exemplary embodiment, end wall portion 40 is formed to include three such slots 100 which are radially arranged.

It will be appreciated by those skilled in the art that the operation of five speed transmission 210 incorporating synchronizer unit 232 of the second preferred embodiment is substantially identical to the operation of the first preferred embodiment and need not be described.

While the specific embodiments of the invention have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

What is claimed:

1. A reverse brake arrangement for a manual transmission of the type including a housing, the reverse brake arrangement comprising:

a shaft rotatably supported by the transmission housing;

a clutch hub mounted on said shaft and adapted to rotate with said shaft, said clutch hub having a splined outer circumference;

a shift sleeve engaged with said splined outer circumference of said clutch hub by a spline movable in the axial direction of said shaft;

a frustoconical cone in coaxial relation to said shaft and disposed on a first side of said clutch hub, said frustoconical cone having a frustoconical surface on an outer periphery thereof;

a first blocker ring coaxial with said shaft, said first blocker ring including a conical surface adapted to be fitted on said frustoconical surface of said frustoconical cone, such that axial translation of said shift sleeve in a direction toward said frustoconical cone urges said first blocker ring against said frustoconical cone;

abutment means for limiting and stopping rotation of said frustoconical cone, said abutment means including at least one tang extending from said frustoconical cone; and limiting means for permitting limited radial translation of said frustoconical cone.

2. The reverse brake arrangement of claim 1, wherein said shaft is an input shaft.

3. The reverse brake arrangement of claim 2, wherein said abutment means for limiting and stopping rotation of said frustoconical cone further includes at least one slot defined by a plurality of axially extending portions of the housing such that said at least one slot receives said at least one tang so as to permit limited rotation of said frustoconical cone.

4. The reverse brake arrangement of claim 2, wherein said at least one tang comprises a plurality of tangs and further wherein said at least one slot comprises a corresponding plurality of slots.

5. The reverse brake arrangement of claim 1, wherein said at least one tang radially extends from said frustoconical cone.

6. The reverse brake arrangement of claim 1, wherein said frustoconical cone is rotationally supported on said shaft.

7. The reverse brake arrangement of claim 6, wherein said at least one tang axially extends from said frustoconical cone.

8. The reverse brake arrangement of claim 4, wherein said shaft includes a forward gear ratio mounted on the other side of said clutch hub, and further comprising:

a synchronizer cone disposed between said forward gear ratio and said clutch hub and in a coaxial relation to said shaft, said synchronizer cone having a frustoconical surface on an outer periphery thereof; and a second blocker ring coaxial with said shaft and including a conical surface adapted to be fitted on said frustoconical surface of said synchronizer cone, such that axial translation of said shift sleeve in a direction toward said synchronizer cone urges said second blocker ring against said synchronizer cone;

whereby axial movement of said shift sleeve toward said forward gear ratio occurs during a forward shifting operation and axial movement of said shift sleeve toward said frustoconical cone occurs during a reverse shifting operation.

9. A manual transmission for a vehicle comprising:

a housing;

a input shaft rotatably mounted in said housing;

a clutch hub mounted on said input shaft and adapted to rotate with the input shaft, said clutch hub having an externally splined surface on an outer circumference thereof;

a shift sleeve having an internally splined surface slidably coupled to said externally splined surface of said clutch hub and being axially movable thereon;

a reverse brake cone disposed on a first side of said shift sleeve and having a external frustoconical friction surface, said reverse brake cone further including at least extending tang;

a first blocker ring disposed between said reverse brake cone and said shift sleeve for developing synchronizing torque therebetween upon axial movement of said shift sleeve in a first direction; and abutment means for limiting and stopping rotation of said reverse brake cone, said abutment means including a plurality of axially extending portions axially extending from said housing such that adjacent axially extending portions define at least slot for receiving said at least one tang and permitting limited rotation of said reverse brake cone, said extending portions includes an inwardly extending radial flange portion, and further wherein said abutment means further comprises a pair of stop wall portions formed on each of said inwardly extending radial flange portions; and limiting means for permitting limited radial translation of said reverse brake cone.

10. The manual transmission of claim 9, wherein each of said inwardly extending radial flange portions includes an arcuate inner wall, each of said arcuate inner walls disposed on a circle coaxially arranged with said input shaft such that said arcuate inner walls cooperate to permit limited radial translation of said reverse brake cone.

11. The manual transmission of claim 10, wherein said at least one tang radially extends from said reverse brake cone.

12. The manual transmission of claim 10, wherein said at least one tang axially extends from said reverse brake cone.

13. The manual transmission of claim 10, further comprising:

a forward gear ratio mounted on the other side of said clutch hub;

a synchronizer cone disposed between said forward gear ratio and said clutch hub and in a coaxial relation to said shaft, said synchronizer cone having a frustoconical surface on an outer periphery thereof; and a second blocker ring coaxial with said shaft and including a conical surface adapted to be fitted on said frustoconical surface of said synchronizer cone, such that axial translation of said shift sleeve in a second toward said synchronizer cone urges said second blocker ring against said synchronizer cone;

whereby axial movement of said shift sleeve in said first direction occurs during a reverse shifting operation and axial movement of said shift sleeve in said second direction occurs during a forward shifting operation.

14. A reverse brake arrangement for a manual transmission of the type including a housing, the reverse brake arrangement comprising:

a shaft rotatably supported by the transmission housing;

a clutch hub mounted on said shaft and adapted to rotate with said shaft, said clutch hub having a splined outer circumference;

a shift sleeve engaged with said splined outer circumference of said clutch hub by a spline movable in the axial direction of said shaft;

a frustoconical cone in coaxial relation to said shaft and disposed on a first side of said clutch hub, said frustoconical cone having a frustoconical surface on an outer periphery thereof;

a first blocker ring coaxial with said shaft, said first blocker ring including a conical surface adapted to be fitted on said frustoconical surface of said frustoconical cone, such that axial translation of said shift sleeve in a direction toward said frustoconical cone urges said first blocker ring against said frustoconical cone;

at least one tang extending from said frustoconical cone; and at least one slot defined by a portion axially extending from the housing such that said at least one slot receives said at least one tang so as to permit limited radial translation and limited rotation of said frustoconical cone.

15. The reverse brake arrangement of claim 14, wherein said shaft is an input shaft.

16. The reverse brake arrangement of claim 14, wherein said at least one tang comprises a plurality of tangs and further wherein said at least one slot comprises a corresponding plurality of slots.

17. The reverse brake arrangement of claim 14, wherein said at least one tang radially extends from said frustoconical cone.

18. The reverse brake arrangement of claim 14, wherein said at least one tang axially extends from said frustoconical cone.

19. The reverse brake arrangement of claim 14, wherein said shaft includes a forward gear ratio mounted on the other side of said clutch hub, and further comprising:

a synchronizer cone disposed between said forward gear ratio and said clutch hub and in a coaxial relation to said shaft, said synchronizer cone having a frustoconical surface on an outer periphery thereof; and a second blocker ring coaxial with said shaft and including a conical surface adapted to be fitted on said frustoconical surface of said synchronizer cone, such that axial translation of said shift sleeve in a direction toward said synchronizer cone urges said second blocker ring against said synchronizer cone;

whereby axial movement of said shift sleeve toward said forward gear ratio occurs during a forward shifting operation and axial movement of said shift sleeve toward said frustoconical cone occurs during a reverse shifting operation.

20. A method of arresting the rotation of a shaft rotatably supported in a housing of a transmission, the method comprising the steps of:

mounting a clutch hub having a splined outer circumference on the shaft, said clutch hub adapted to rotate with the shaft;

slidably engaging a shift sleeve having a spline with said splined outer circumference of said clutch hub;

mounting a frustoconical cone in coaxial relation to the shaft on a first side of said clutch hub, said frustoconical cone having a frustoconical surface on an outer periphery thereof and at least one tang extending therefrom;

mounting a blocker ring coaxial with the shaft, said blocker ring including a conical surface adapted to be fitted on said frustoconical surface of said frustoconical cone;

axially translating said shift sleeve toward said frustoconical cone;

urging said blocker ring against said frustoconical cone; and permitting limited rotation and radial translation of said frustoconical cone as said blocker ring is urged against said frustoconical cone.

\* \* \* \* \*